US010124756B2

(12) United States Patent
Nakajima et al.

(10) Patent No.: US 10,124,756 B2
(45) Date of Patent: Nov. 13, 2018

(54) HYBRID VEHICLE

(71) Applicant: HONDA MOTOR CO., LTD., Tokyo (JP)

(72) Inventors: Kenji Nakajima, Wako (JP); Masafumi Amano, Wako (JP); Keiji Shiota, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/409,533

(22) Filed: Jan. 19, 2017

(65) Prior Publication Data

US 2017/0210315 A1    Jul. 27, 2017

(30) Foreign Application Priority Data

Jan. 25, 2016  (JP) .................................. 2016-011515

(51) Int. Cl.
*B60R 17/02* (2006.01)
*B60K 6/24* (2007.10)
(Continued)

(52) U.S. Cl.
CPC ................. *B60R 17/02* (2013.01); *B60K 6/24* (2013.01); *B60K 6/26* (2013.01); *B60K 6/387* (2013.01);
(Continued)

(58) Field of Classification Search
CPC ............ H02K 9/00; H02K 9/19; H02K 9/193; H02K 5/20; B60R 17/02; B60K 6/24;
(Continued)

(56) References Cited

U.S. PATENT DOCUMENTS 4,018,059 A * 4/1977 Hatch .................... F16L 59/185
277/432
4,418,777 A * 12/1983 Stockton ............. F16H 57/0413
180/65.6
(Continued)

FOREIGN PATENT DOCUMENTS

| JP | 05-330348 | 12/1993 |
| JP | 09-053603 | 2/1997 |
| JP | 2012-106599 | 6/2012 |

OTHER PUBLICATIONS

Japanese Office Action for corresponding JP Application No. 2016-011515, dated Jan. 10, 2018 (w/ English machine translation).
(Continued)

*Primary Examiner* — James A Shriver, II
*Assistant Examiner* — Brian L Cassidy
(74) *Attorney, Agent, or Firm* — Mori & Ward, LLP

(57) ABSTRACT

A hybrid vehicle includes a generator to be driven by an internal combustion engine to generate an electric power. The internal combustion engine is to drive vehicle wheels via a hydraulic clutch. The electric power is to be supplied to an electric motor to drive the vehicle wheels. An oil pump is to be driven by the internal combustion engine to supply oil to the electric motor and the generator and to the hydraulic clutch. A valve is to decrease a first amount of the oil to be supplied to the electric motor and the generator and to increase a second amount of the oil to be supplied to the hydraulic clutch when the hydraulic clutch is in an engaged state. The valve is to increase the first amount of the oil and to decrease the second amount of the oil when the hydraulic clutch is in a disengaged state.

11 Claims, 11 Drawing Sheets

(51) Int. Cl.

| | |
|---|---|
| *B60K 6/26* | (2007.10) |
| *B60K 6/387* | (2007.10) |
| *B60K 6/44* | (2007.10) |
| *B60K 11/02* | (2006.01) |
| *F02B 63/04* | (2006.01) |
| *F02B 63/06* | (2006.01) |
| *F16D 25/12* | (2006.01) |
| *F16N 7/38* | (2006.01) |
| *F16N 13/22* | (2006.01) |
| *F01M 1/12* | (2006.01) |
| *F01M 1/16* | (2006.01) |
| *F16N 7/36* | (2006.01) |
| *F16H 57/04* | (2010.01) |
| *F16D 25/0638* | (2006.01) |
| *B60K 6/28* | (2007.10) |

(52) U.S. Cl.
CPC ............... *B60K 6/44* (2013.01); *B60K 11/02* (2013.01); *F01M 1/12* (2013.01); *F01M 1/16* (2013.01); *F02B 63/04* (2013.01); *F02B 63/06* (2013.01); *F16D 25/0638* (2013.01); *F16D 25/123* (2013.01); *F16H 57/043* (2013.01); *F16N 7/363* (2013.01); *F16N 7/385* (2013.01); *F16N 13/22* (2013.01); *B60K 6/28* (2013.01); *F16N 2210/04* (2013.01); *Y10S 903/905* (2013.01); *Y10S 903/906* (2013.01); *Y10S 903/907* (2013.01); *Y10S 903/914* (2013.01); *Y10S 903/946* (2013.01)

(58) Field of Classification Search
CPC ... B60K 6/26; B60K 6/28; B60K 6/44; B60K 6/387; B60K 11/02; F02B 63/04; F02B 63/06; F16N 7/385; F16N 13/22; F16N 2210/04

See application file for complete search history.

(56) References Cited

U.S. PATENT DOCUMENTS

| | | | |
|---|---|---|---|
| 2004/0124722 A1* | 7/2004 | Uchida | B60K 6/26 310/54 |
| 2006/0022528 A1* | 2/2006 | Burgman | B60K 6/26 310/54 |
| 2012/0032544 A1* | 2/2012 | Kasuya | B60K 1/00 310/90 |
| 2013/0151057 A1* | 6/2013 | Matsubara | B60K 6/445 701/22 |
| 2013/0191012 A1* | 7/2013 | Hirotsu | B60W 10/02 701/113 |
| 2014/0054988 A1 | 2/2014 | Hofmaier | |
| 2014/0179477 A1* | 6/2014 | Yamamoto | F16H 57/0025 475/1 |
| 2016/0052379 A1* | 2/2016 | Inoue | B60L 3/0023 74/661 |
| 2016/0144860 A1* | 5/2016 | Naito | F16H 61/02 475/127 |

OTHER PUBLICATIONS

Japanese Office Action for corresponding JP Application No. 2016-011515, dated Jun. 21, 2017.

* cited by examiner

HYBRID VEHICLE

CROSS-REFERENCE TO RELATED APPLICATIONS

The present application claims priority under 35 U.S.C. § 119 to Japanese Patent Application No. 2016-011515, filed Jan. 25, 2016. The contents of this application are incorporated herein by reference in their entirety.

BACKGROUND OF THE INVENTION

Field of the Invention

The present invention relates to a hybrid vehicle.

Discussion of the Background

Japanese Patent Application Publication No. 2012-106599 discloses a hybrid vehicle that travels by driving the electric motor with electric power generated by driving the generator in the internal combustion engine, and in which the oil discharged from the oil pump which operates in conjunction with the rotary shaft of the internal combustion engine is supplied to the electric motor and the generator as the cooling oil, and the oil is supplied to a hydraulic clutch for transmitting the driving force of the internal combustion engine to the vehicle wheels as the lubricating oil.

SUMMARY OF THE INVENTION

According to one aspect of the present invention, a hybrid vehicle includes an internal combustion engine that drives a generator and drives vehicle wheels via a hydraulic clutch, an electric motor that is actuated by an electric power generated by the generator to drive the vehicle wheels, and an oil pump that supplies oil pumped up from an oil tank to the electric motor and the generator as a cooling oil, and supplies the oil to the part to be lubricated of the hydraulic clutch as a lubricating oil, the hybrid vehicle includes a valve that distributes the oil discharged from the oil pump to parts to be lubricated of the electric motor, the generator and the hydraulic clutch, wherein, when the hydraulic clutch is in an engaged state, the valve decreases the supply amount of the oil to the electric motor and the generator and increases the supply amount of the oil to the part to be lubricated of the hydraulic clutch, and when the hydraulic clutch is in a disengaged state, the valve increases the supply amount of the oil to the electric motor and the generator and decreases the supply amount of the oil to the part to be lubricated of the hydraulic clutch.

According to another aspect of the present invention, a hybrid vehicle includes an internal combustion engine, a generator, a hydraulic clutch, an electric motor, and an oil pump. The generator is to be driven by the internal combustion engine to generate an electric power. The internal combustion engine is to drive vehicle wheels via the hydraulic clutch. The electric power generated by the generator is to be supplied to the electric motor to drive the vehicle wheels. The oil pump is to be driven by the internal combustion engine to supply oil to the electric motor and the generator and to the hydraulic clutch. The valve is to decrease a first amount of the oil to be supplied to the electric motor and the generator and to increase a second amount of the oil to be supplied to the hydraulic clutch when the hydraulic clutch is in an engaged state. The valve is to increase the first amount of the oil and to decrease the second amount of the oil when the hydraulic clutch is in a disengaged state.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
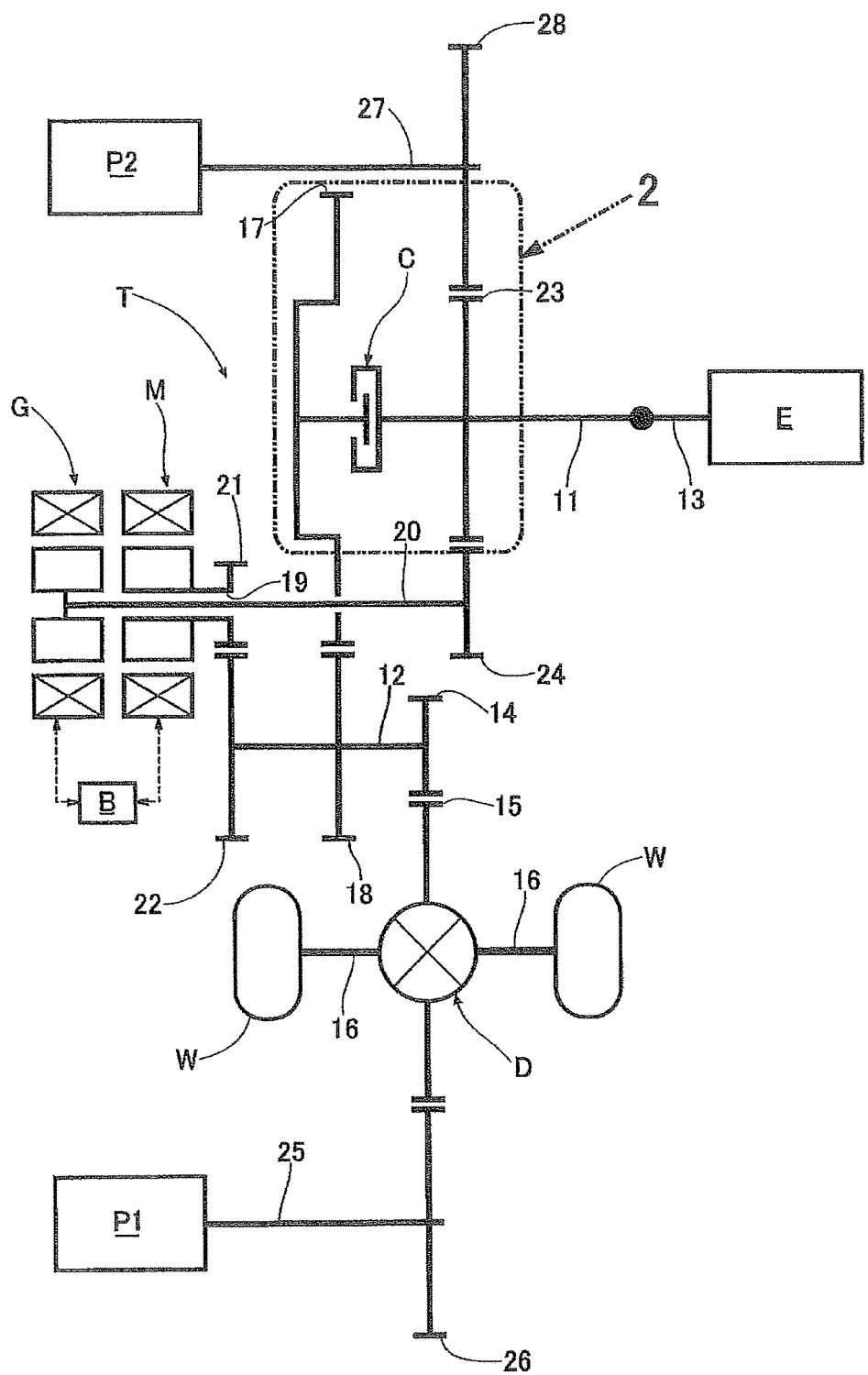
FIG. 1 is a skeleton diagram of a power transmission system of a hybrid vehicle (First Embodiment).

The embodiment(s) will now be described with reference to the accompanying drawings, wherein like reference numerals designate corresponding or identical elements throughout the various drawings.

Hereinafter, a first embodiment of the present invention will be described with reference to FIGS. 1 to 5B.

FIG. 1 is a skeleton diagram of a power transmission system of a hybrid vehicle, and a transmission T includes an input shaft 11 and an output shaft 12 that are disposed in parallel. A crankshaft 13 of the internal combustion engine E is connected in series to the input shaft 11, and the output shaft 12 is connected to left and right wheels W, W via a final drive gear 14, a final driven gear 15, a differential gear D and left and right drive shafts 16, 16. A first drive gear 17 supported on the input shaft 11 via a hydraulic clutch C meshes with a first driven gear 18 which is fixedly installed on the output shaft 12.

An electric motor M and a generator G are coaxially disposed, and a generator shaft 20 is fitted inside a hollow electric motor shaft 19 to be relatively rotatable. A second drive gear 21 which is fixedly installed on the electric motor shaft 19 meshes with a second driven gear 22 fixedly installed on the output shaft 12, and a generator drive gear 23 fixedly installed on the input shaft 11 meshes with a generator driven gear 24 fixedly installed on the generator shaft 20. The electric motor M and the generator G are connected to a battery B.

A first pump gear 26 fixedly installed on the first pump shaft 25 of the first oil pump P1 meshes with the final driven gear 15, and when the vehicle wheels W, W rotate, the first oil pump P1 is driven by the driving force. Further, a second pump gear 28 fixedly installed on the second pump shaft 27 of the second oil pump P2 meshes with the generator drive gear 23, and when the internal combustion engine E rotates, the second oil pump P2 is driven by the driving force.

Figure 2:
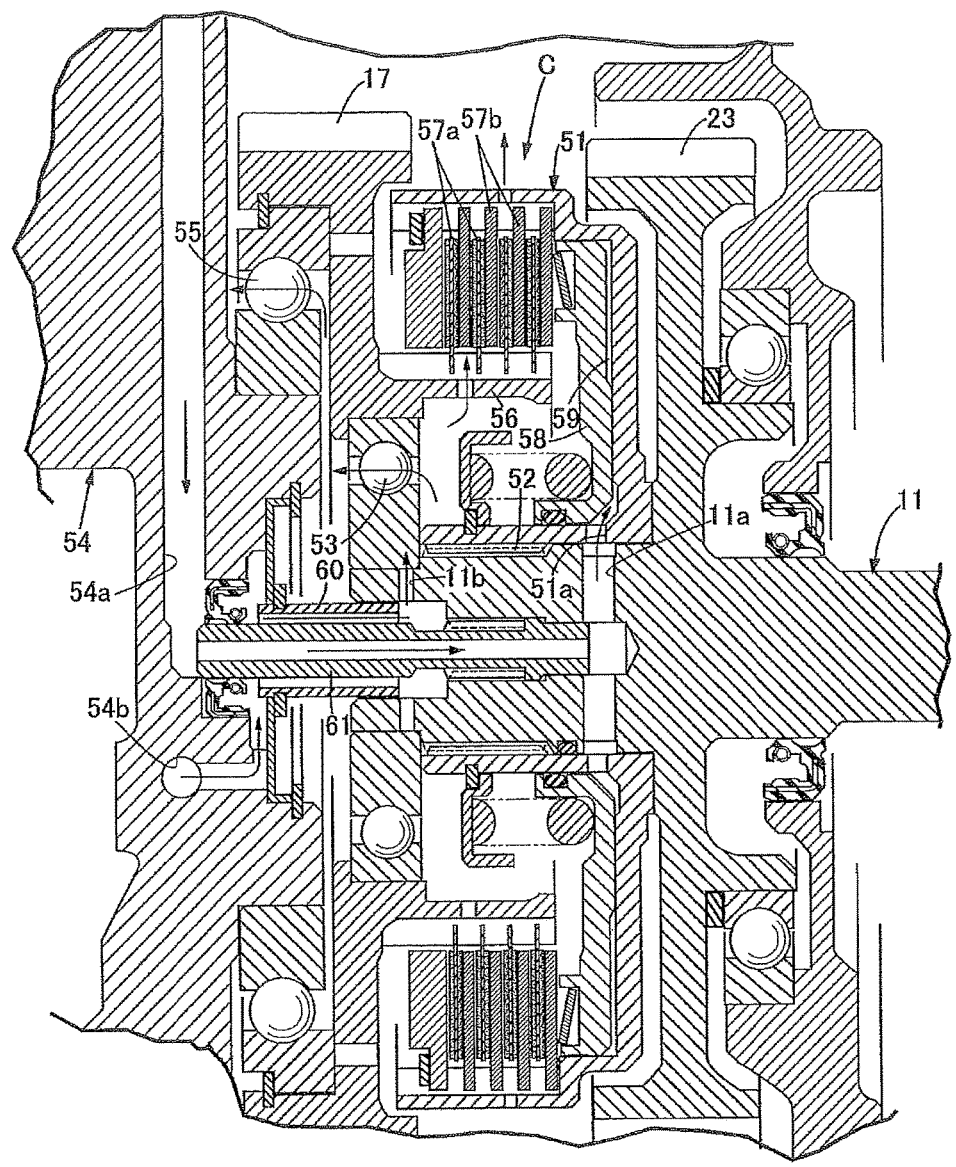
FIG. 2 is an enlarged view of part 2 of FIG. 1 (First Embodiment).

As illustrated in FIG. 2, a clutch outer 51 of the hydraulic clutch C is coupled to the outer circumference of the input shaft 11 via a spline fitting portion 52. The first drive gear 17 is supported on the outer circumference of the input shaft 11 via a ball bearing 53, and is supported on a transmission case 54 via a ball bearing 55. A clutch inner 56 of the hydraulic clutch C is formed integrally with the first drive gear 17, and a frictional engagement member formed by a plurality of clutch discs 57a . . . (a friction member) and a plurality of clutch plates 57b . . . is disposed between the clutch outer 51 and the clutch inner 56. The clutch plates 57b . . . are fitted to the clutch outer 51, and the clutch discs 57a . . . are fitted to the clutch inner 56. The clutch piston 58 facing axial one end of the clutch discs 57a . . . and the clutch plates 57b . . . is slidably fitted into the inside of the clutch outer 51, and a clutch oil chamber 59 is defined between the clutch outer 51 and the clutch piston 58.

The outer pipe 60 and the inner pipe 61 are coaxially fitted to the inner circumference of the axial end portion of the input shaft 11, and a clutch actuating oil passage 54a formed inside the transmission case 54 communicates with the clutch oil chamber 59 via an internal oil passage of the inner pipe 61, an oil hole 11a passing through the input shaft 11 in the radial direction, and an oil hole 51a passing through the clutch outer 51 in the radial direction. Further, a cooling oil passage 54b formed inside the transmission case 54 communicates with the oil hole lib passing through the input shaft 11 in the radial direction via the oil passage between the outer pipe 60 and the inner pipe 61, and the oil passing through the oil hole 11b and scattered to the radially outside by centrifugal force lubricates the spline fitting portion 52, the clutch discs 57a, the clutch plates 57b . . . , the ball bearing 53 and the ball bearing 55.

Figure 3:
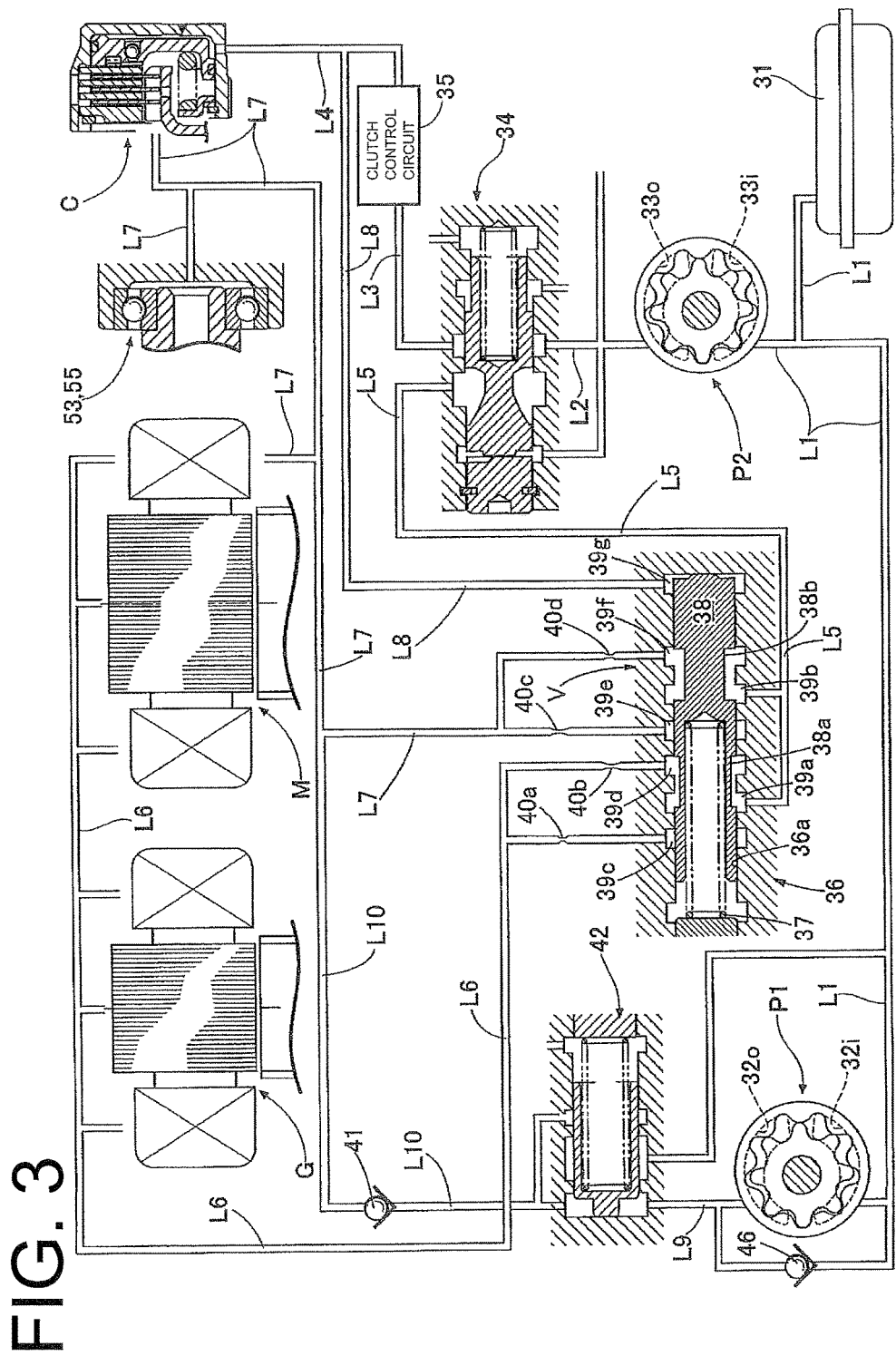
FIG. 3 is a hydraulic circuit of a cooling and lubrication system of an electric motor, a generator and a hydraulic clutch (First embodiment).

FIG. 3 illustrates a hydraulic circuit of a cooling and lubricating system such as the hydraulic clutch C, the electric motor M and the generator G, and the oil passage L1 extending from the oil tank 31 is connected to an intake port 32i of the first oil pump 21 and an intake port 33i of the second oil pump P2.

An oil passage L2 extending from a discharge port 33o of the second oil pump P2 is connected to the oil passage L3 via a first regulator valve 34, and the oil passage L3 communicates with the clutch oil chamber 59 of the hydraulic clutch C via the clutch control circuit 35 and the oil passage L4. Further, an oil passage L5 extending from a relief port of the first regulator valve 34 is connected to the oil passage switching valve V.

The oil passage switching valve V includes a spool 38 which is slidably fitted to the valve hole 36a formed in the valve body 36 and is biased in one direction by the spring 37. The valve hole 36a includes a first input port 39a, a second input port 39b, a first output port 39c, a second output port 39d, a third output port 39e and a fourth output port 39f, and the spool 38 includes a first group 38a which connects the first input port 39a to one of the first output port 39c and the second output port 39d, and a second group 38b that connects the second input port 39b to one of the third output port 39e and the fourth output port 39f.

The first output port 39c and the second output port 39d communicates with a cooling target part made up of a coil or an iron core of the electric motor M and the generator G via the oil passage L6. A first small-diameter orifice 40a is disposed between the first output port 39c and the oil passage L6, and a first large-diameter orifice 40b is disposed between the second output port 39d and the oil passage L6. Further, the third output port 39e and the fourth output port 39f communicate with the part to be lubricated around the hydraulic clutch C, that is, the spline fitting portion 52, the clutch discs 57a . . . , the clutch plates 57b . . . , the ball bearing 55 and the ball bearing 53, and the coil of the electric motor M, via the oil passage L7. A second large-diameter orifice 40c is disposed between the third output port 39e and the oil passage L7, and a second small-diameter orifice 40d is disposed between the fourth output port 39f and the oil passage L7.

A pilot port 39g that faces the one end of the spool 38 is formed at one end of the valve hole 36a, and the pilot port 39g communicates with the downstream oil passage L4 of the clutch control circuit 35 via the oil passage L8.

The oil passage L1 extending from the oil tank 31 is connected to the intake port 32i of the first oil pump P1, and the oil passage L9 connected to the discharge port 32o of the first oil pump P1 communicates with the oil passage L7 via the second regulator valve 42 and the oil passage L10.

A check valve 41 that prevents a reverse flow of oil from the oil passage switching valve V side to the second regulator valve 42 side is disposed in the oil passage L10, and between the oil passage L1 and the oil passage L9 with the first oil pump P1 interposed therebetween, a check valve 46 that prevents the reverse flow of the oil from the oil passage L9 side to the oil passage L1 side is disposed.

Next, the operation of the embodiment of the present invention having the above-described configuration will be described.

As the operating modes of the hybrid vehicle of this embodiment, there are a series hybrid mode and a parallel hybrid mode.

Figure 5A:
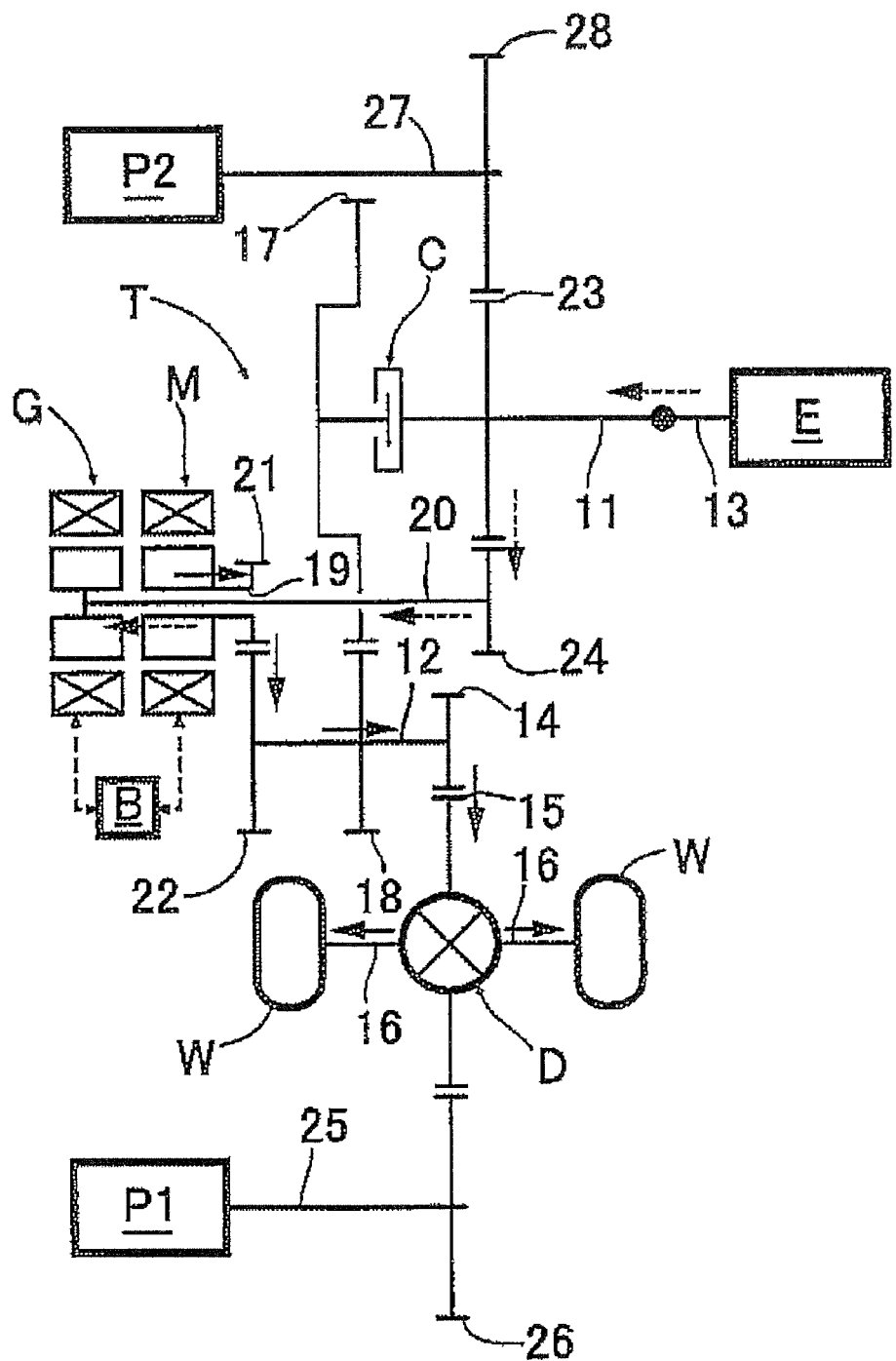
FIGS. 5A and 5B are explanatory views of the operation mode of the hybrid vehicle (First Embodiment).

As illustrated in FIG. 5, the series hybrid mode is a mode of traveling by driving the electric motor M with the electric power generated by driving the generator G in the internal combustion engine E. When driving the internal combustion engine E in the state of disengaging the hydraulic clutch C, the driving force of the crankshaft 13 is transmitted to the generator G via the route of the input shaft 11→the generator drive gear 23→the generator driven gear 24→the generator shaft 20, thereby enabling the generator G to generate electricity. When driving the electric motor M, the driving force of the electric motor shaft 19 is transmitted to the left and right wheels W, W via the route of the second drive gear 21→the second driven gear 22→the output shaft 12→the final drive gear 14→the final driven gear 15→the differential gear D→the drive shafts 16, 16. Since the electric motor M is rotatable in forward and reverse directions, it is possible to allow the vehicle to travel forward or travel backward in accordance with the direction of rotation. Further, as long as the electric motor M is driven by the driving force transmitted from the vehicle wheels W, W at the time of deceleration of vehicle to function as the generator, the kinetic energy of the vehicle can be recovered to the battery B as electrical energy.

Further, since the internal combustion engine E is directly connected to the generator G, if the generator G is driven as the electric motor during stop of the internal combustion engine E, it is possible to start the internal combustion engine E by cranking with the driving force of the generator G.

Figure 5B:
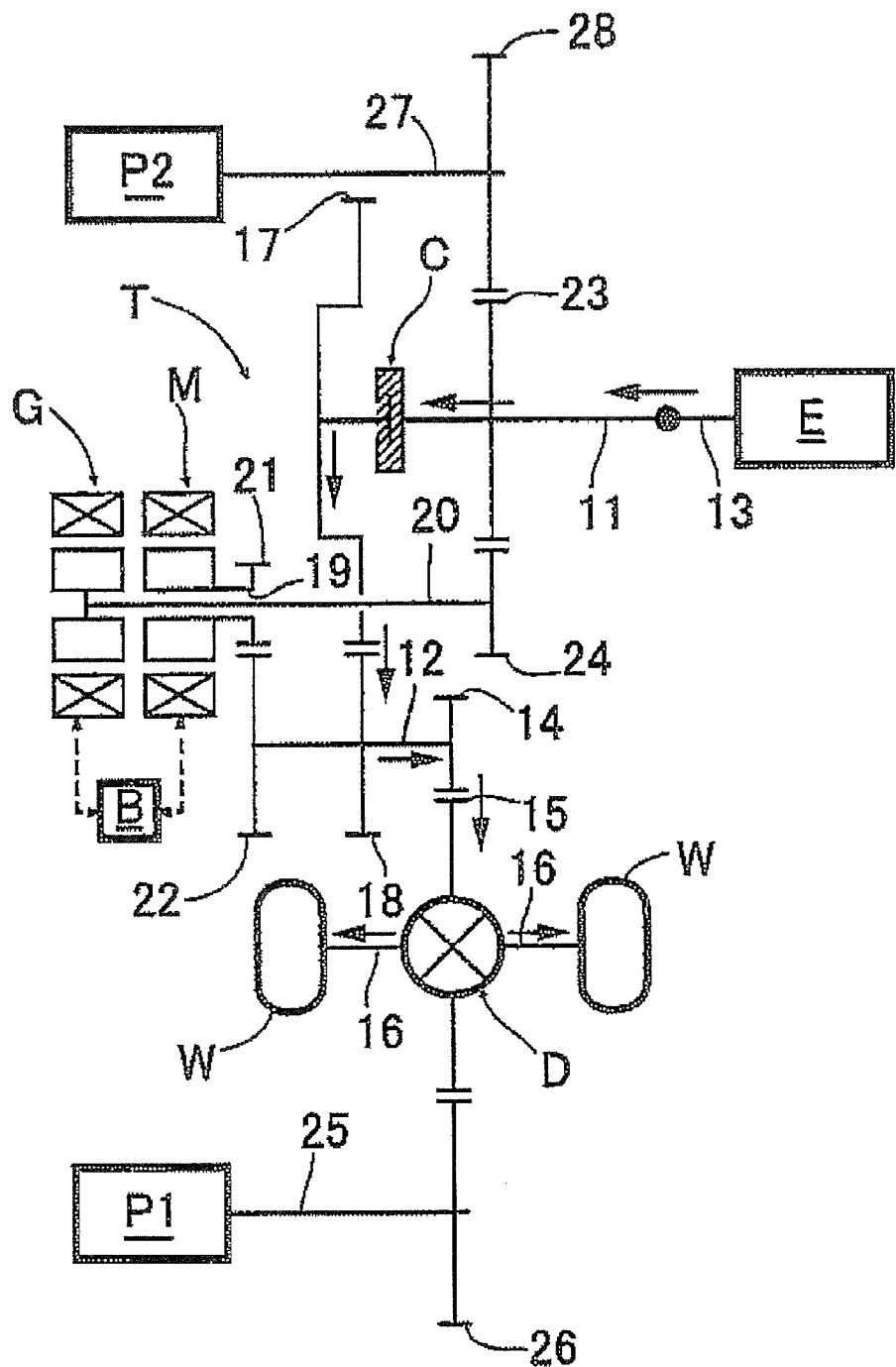

As illustrated in FIG. 5B, the parallel hybrid mode is a mode of mainly traveling by the driving force of the internal combustion engine E. When driving the internal combustion engine E in the state of engaging the hydraulic clutch C, the driving force of the crankshaft 13 is transmitted to the left and right wheels W, W via the route of the input shaft 11→the hydraulic clutch C→the first drive gear 17→the first driven gear 18→the output shaft 12→the final drive gear 14→the final driven gear 15→the differential gear D→drive shafts 16, 16, thereby enabling the vehicle to travel forward. If the electric motor M is driven together with the internal combustion engine E at this time, it is possible to assist the driving force of the internal combustion engine E by the driving force of the electric motor M.

Since the electric motor M and the generator G are driven in the series hybrid mode, it is necessary to sufficiently cool the electric motor M and the generator G that generate heat. However, since the hydraulic clutch C is disengaged and does not transmit the driving force, there is not so much need to lubricate the fitting portion between the spline fitting portion 52, the clutch discs 57a . . . , the clutch plates 57b . . . , the fitting portion between the clutch inner 56 and the clutch outer 51, the ball bearing 55 and the ball bearing 53 etc., as the parts to be lubricated around the hydraulic clutch C. Meanwhile, since the hydraulic clutch C is engaged to transmit the driving force of the internal combustion engine E in the parallel hybrid mode, it is necessary to sufficiently lubricate the lubrication target portion around the hydraulic clutch C. However, since the amount of work of the electric motor M and the generator G do is smaller than that of the series hybrid mode, there is no need to cool the electric motor M and the generator G too much.

Thus, in the series hybrid mode, it is necessary to increase the cooling oil supplied to the electric motor M and the generator G and reduce the lubricating oil supplied to the lubrication target portion around the hydraulic clutch C. In contrast, in the parallel hybrid mode, it is necessary to reduce the cooling oil supplied to the electric motor M and the generator G and increase the lubricating oil supplied to the lubrication target portion around the hydraulic clutch C. Hereinafter, the aforementioned control of the supply amount of the oil will be described.

In FIG. 3, when the vehicle travels forward and the internal combustion engine E is driven, cooling and lubrication are performed by oil discharged from the second oil pump P2. That is, when the vehicle travels forward and the internal combustion engine E is driven, the second oil pump P2 connected to the internal combustion engine E sucks oil of the oil tank 31 to the intake port 33i from the oil passage L1, and discharges the oil to the oil passage L2 from the discharge port 33o.

After the pressure of oil discharged to the discharge oil passage L2 is adjusted by the first regulator valve 34, the oil is supplied from the oil passage L3 to the clutch control circuit 35. The clutch control circuit 35 engages the hydraulic clutch C, by supplying a high hydraulic pressure to the clutch oil chamber 59 of the hydraulic clutch C via the oil passage L4 at the time of the parallel hybrid mode.

Figure 4A:
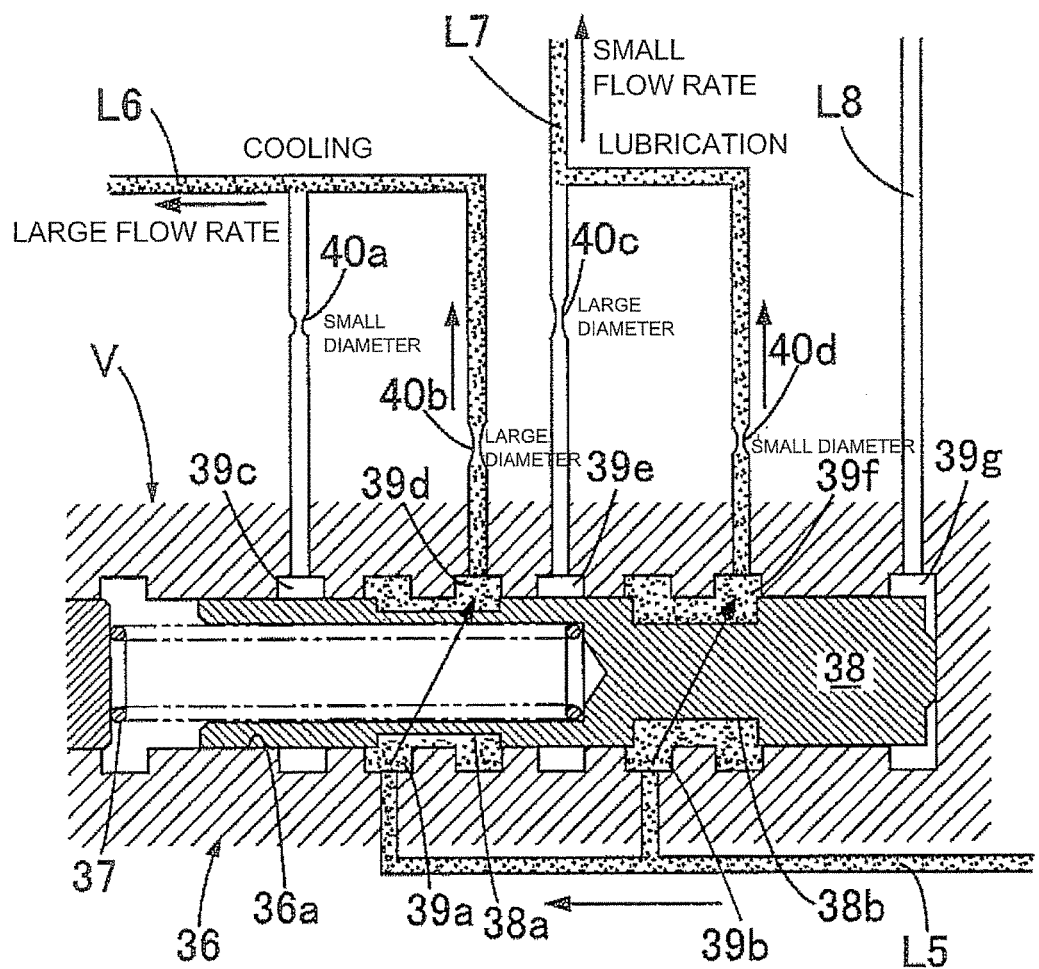
FIGS. 4A and 4B are operation explanatory views of an oil passage switching valve (First Embodiment).

Further, the surplus oil discharged from the first regulator valve 34 is supplied to the first input port 39a and the second input port 39b of the flow passage switching valve V. At this time, in the case of the series hybrid mode of traveling by the driving force of the electric motor M, since the hydraulic clutch C is disengaged, the hydraulic pressure supplied to the clutch oil chamber 59 of the hydraulic clutch C from the clutch control circuit 39 becomes a low pressure. As a result, as illustrated in FIG. 4A, the hydraulic pressure transmitted to the pilot port 39g of the flow passage switching valve V becomes a low pressure, the spool 38 moves rightward in FIG. 4A by the resilient force of the spring 37, the first input port 39a communicates with the second output port 39d, and the second input port 39b communicates with the fourth output port 39f.

Since the second output port 39d communicates with the electric motor M and the generator G via the first large-diameter orifice 40b and the oil passage L6, the flow rate of the cooling oil supplied to the electric motor M and the generator G increases. In contrast, since the fourth output port 39f communicates with the lubrication target portion around the hydraulic clutch C via the second small-diameter orifice 40d and the oil passage L7, the flow rate of the lubricating oil supplied to the part to be lubricated is reduced.

Figure 4B:
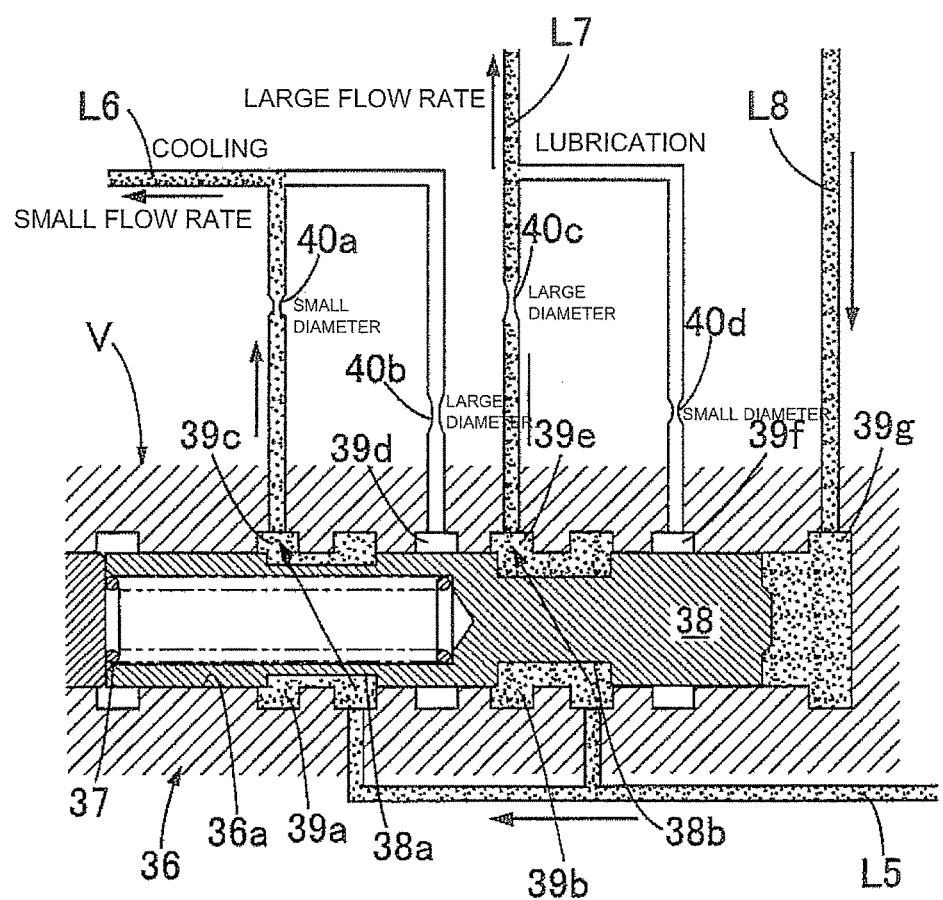

Meanwhile, in the case of the parallel hybrid mode of mainly traveling by the driving force of the internal combustion engine E, since the hydraulic clutch C is engaged, the hydraulic pressure supplied to the clutch oil chamber 59 of the hydraulic clutch C from the clutch control circuit 39 becomes higher. As a result, as illustrated in FIG. 4B, the hydraulic pressure transmitted to the pilot port 39g of the flow passage switching valve V becomes higher, the spool 38 is moved leftward in FIG. 4B against the resilient force of the spring 37, the first input port 39a communicates with the first output port 39c, and the second input port 39b communicates with the third output port 39e.

The first output port 39c communicates with the electric motor M and the generator G via the first small-diameter orifice 40a, the flow rate of the cooling oil supplied to the electric motor M and the generator G decreases. In contrast, since the third output port 39e communicates with the part to be lubricated around the hydraulic clutch C via the second large-diameter orifice 40c, the flow rate of the lubricating oil supplied to the part to be lubricated increases.

As described above, according to the present embodiment, by switching the flow passage switching valve V by utilizing the operating hydraulic pressure of the hydraulic clutch C that is engaged only during the parallel hybrid mode, a sufficient amount of cooling oil is supplied to the electric motor M and the generator G at the time of the series hybrid mode, and a sufficient amount of lubricating oil is supplied to the part to be lubricated around the hydraulic clutch C at the time of the parallel hybrid mode. Accordingly, since the volume of the second oil pump P2 is kept to a minimum requirement, by distributing the required amount of cooling oil and lubricating oil which varies depending on the operating mode at a suitable proportion without requiring special sensors, it is possible to achieve both of the cooling of the electric motor M and the generator G and the lubrication of the part to be lubricated around the hydraulic clutch C by a simple structure.

Moreover, at the time of high-speed forward traveling, the amount of cooling oil required by the electric motor M and the generator G and the amount of the lubricating oil required by the part to be lubricated around the hydraulic clutch C also increase. However, since the rotational speed of the second oil pump P2 increases and the discharge amount of the oil also increases at the time of high-speed forward traveling, it is possible to automatically secure the required amount of oil that varies depending on the forward traveling speed of the vehicle.

Further, when the vehicle travels forward by the driving force of both of the electric motor M and the engine E, for example, at the time of forward high-speed traveling or forward uphill, the cooling and lubrication are performed by the sufficient amount of oil that is discharged from both of the first oil pump P1 and the second oil pump P2.

Second Embodiment

Next, a second embodiment of the present invention will be described with reference to FIGS. 6A and 6B.

The second embodiment is different from the first embodiment in the structure of the flow passage switching valve V, and the valve body 36 of the flow passage switching valve V includes an input port 43a connected to the oil passage L5 and the oil passage L6, first and second output ports 43b and 43c connected to the oil passage L7, and a pilot port 43d connected to the oil passage L8. A large-diameter orifice 44a is disposed between the first output port 43b and the oil passage L7, and a small-diameter orifice 44b is disposed between the second output port 43c and the oil passage L7. The spool 38 includes a group 38c that selectively connects the input port 43a to one of the first and second output ports 43b and 43c. An orifice 44c is disposed on the oil passage L6.

Figure 6A:
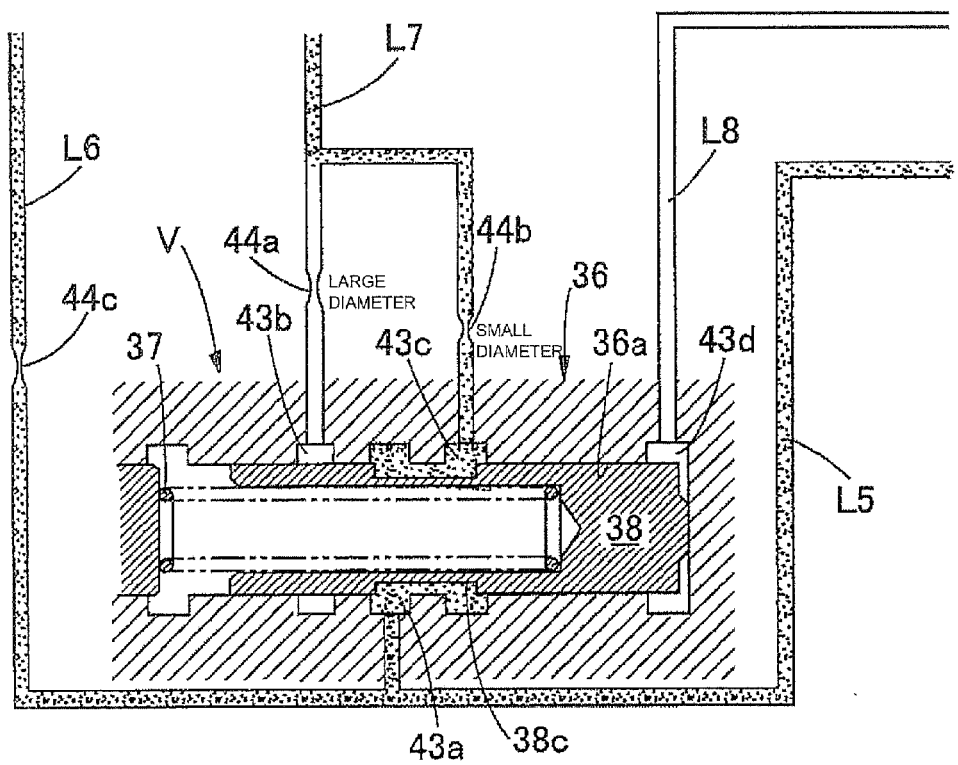
FIGS. 6A and 6B are diagrams corresponding to FIGS. 4A and 4B (Second Embodiment).

According to this embodiment, although the oil discharged from the second oil pump P2 is steadily supplied to the electric motor M and the generator G via the oil passage L2, the oil passage L5 and the oil passage L6, in the series hybrid mode in which the hydraulic clutch C is disengaged and the vehicle travels by the driving force of the electric motor M, as illustrated in FIG. 6A, the hydraulic pressure transmitted to the pilot port 43d of the flow passage switching valve V becomes a low pressure, the spool 38 moves rightward in FIG. 6A by the resilient force of the spring 37, and the input port 43a communicates with the second out port 43c. Since the second output port 43c and the oil passage L7 communicate with each other via the small-diameter orifice 44b, when the flow rate of the lubricating oil supplied to the part to be lubricated around the hydraulic clutch C decreases, the flow rate of cooling oil supplied to the electric motor M and the generator G relatively increases.

Figure 6B:
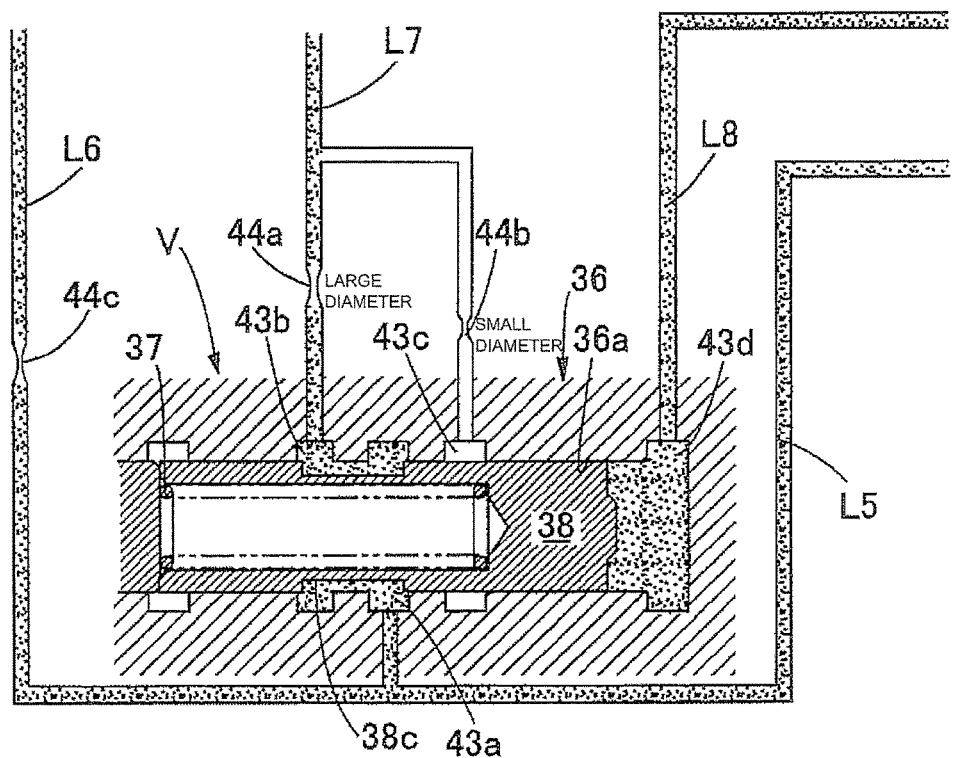

Conversely, in the parallel hybrid mode of mainly traveling by the driving force of the internal combustion engine E, as illustrated in FIG. 6B, the hydraulic pressure transmitted to the pilot port 43d of the flow passage switching valve V becomes a high pressure, the spool 38 moves leftward in FIG. 6B against the elastic force of the spring 37, and the input port 43a communicates with the first output port 43b. Since the first output port 43b and the oil passage L7 communicate with each other via the large-diameter orifice 44a, when the flow rate of the lubricating oil supplied to the part to be lubricated around the hydraulic clutch C increases, the flow rate of the cooling oil to be supplied to the electric motor M and the generator G indirectly decreases.

As described above, according to the present embodiment, it is possible to achieve the same effects as the aforementioned first embodiment.

Third Embodiment

Figure 7A:
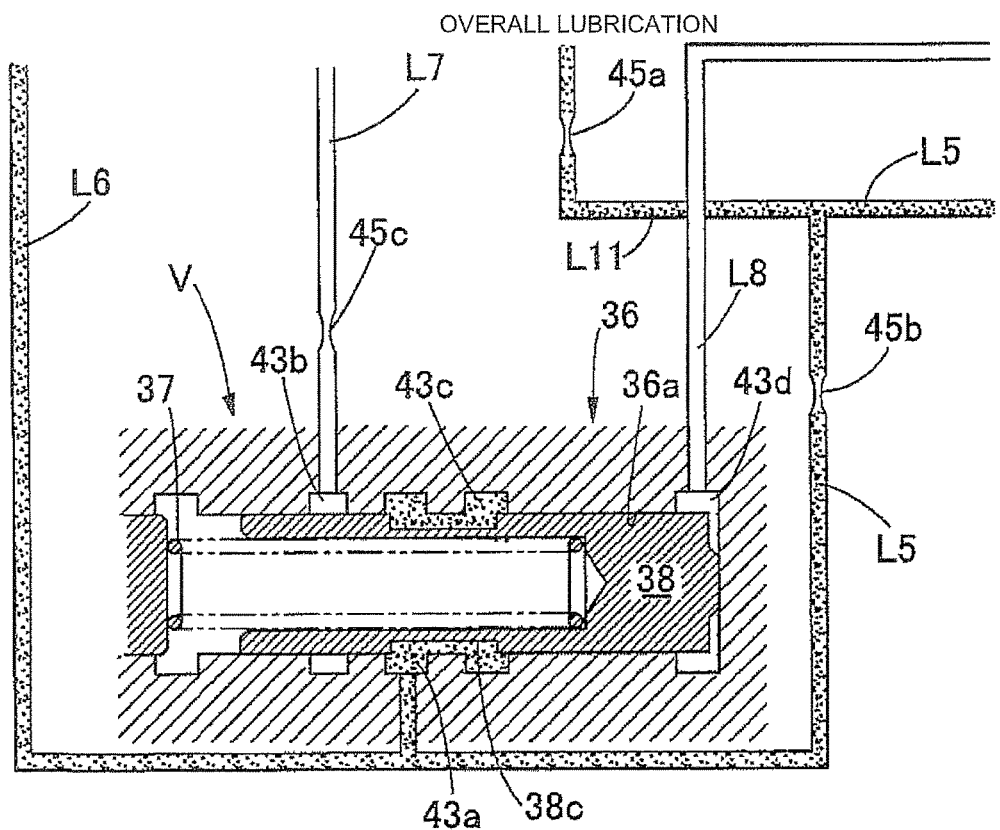
FIGS. 7A and 7B are diagrams corresponding to FIGS. 4A and 4B (Third Embodiment).

Next, a third embodiment of the present invention will be described with reference to FIGS. 7A and 7B.

The third embodiment is a modified example of the aforementioned second embodiment, and the structure of the flow passage switching valve V is the same as that of the second embodiment, but differs in a connection relation with the oil passage. That is, an oil passage L5 from the first regulator valve 34 is connected to the respective parts to be lubricated including the parts to be lubricated around the electric motor M and the hydraulic clutch C via an oil passage L11 having an orifice 45a, is connected to the input port 43a of the flow passage switching valve V via the orifice 45b, and is further connected to the oil passage L6. Further, the first output port 43b is connected to an oil passage L7 having an orifice 45c, and the second output port 43c is closed.

According to the present embodiment, the oil discharged from the second oil pump P2 is steadily supplied to the parts to be lubricated, including the parts to be lubricated around the electric motor M and the hydraulic clutch C via the oil passage L2, the oil passage L5 and the oil passage L11, and is steadily supplied to the electric motor M and the generator G via the oil passage L6. In the series hybrid mode in which the hydraulic clutch C is disengaged and the vehicle travels by the driving force of the electric motor M, as illustrated in FIG. 7A, the hydraulic pressure transmitted to the pilot port 43d of the flow passage switching valve V becomes a low pressure, the spool 38 moves rightward in FIG. 7A by the resilient force of the spring 37, and the input port 43a communicates with the closed second output port 43c. As a result, the distribution ratio of the lubricating oil to the part to be lubricated around the electric motor M and the hydraulic clutch C, and the distribution ratio of the cooling oil to the electric motor M and the generator G are determined by the diameters of the orifice 45a and orifice 45b.

Figure 7B:
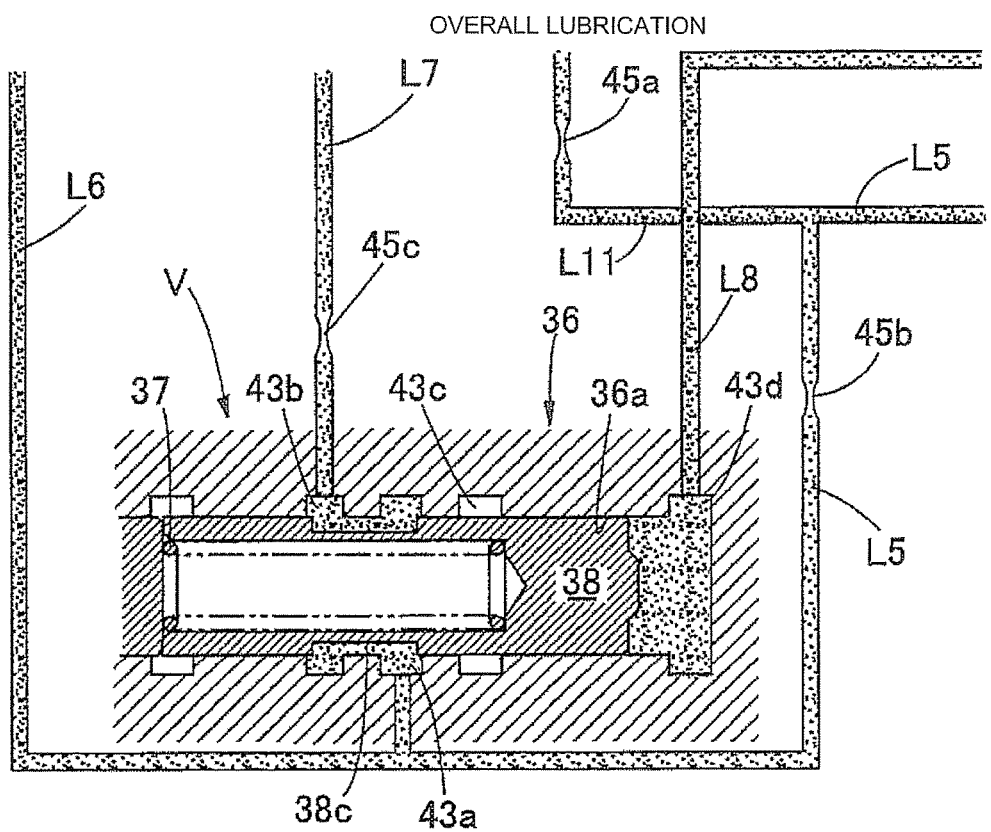

In the parallel hybrid mode of mainly traveling by the driving force of the internal combustion engine E, as illustrated in FIG. 7B, the hydraulic pressure transmitted to the pilot port 43d of the flow passage switching valve V becomes the high pressure, the spool 38 moves leftward in FIG. 7B against the resilient force of the spring 37, and the input port 43a communicates with the first output port 43b. As a result, the first output port 43b communicates with the oil passage L7 via the orifice 45c, and since the flow rate of the oil supplied to the parts to be lubricated around the hydraulic clutch C increases, the flow rate of cooling oil supplied to the electric motor M and the generator G relatively decreases.

As described above, according to the present embodiment, it is possible to achieve the same effects as the aforementioned first embodiment.

While the embodiments of the present invention have been described, the present invention can be modified in a variety of ways within the scope that does not depart from the gist thereof.

For example, the types of the first and second oil pumps P1 and P2 may be optional, and it is possible to adopt any type of pumps such as a trochoid pump, a vane pump, a gear pump and a piston pump.

Further, although the lubricating oil is supplied to the part to be lubricated around the hydraulic clutch C in the embodiments, there is no need to necessarily supply the lubricating oil to the ball bearing 55 or the ball bearing 53 of the outside of the hydraulic clutch C, and the lubricating oil may only be supplied to the part to be lubricated of the hydraulic clutch C (for example, the spline fitting portion 52, the clutch disc 57a, the clutch plate 57b).

According to a first aspect of the present invention, a hybrid vehicle includes an internal combustion engine that drives a generator and drives vehicle wheels via a hydraulic clutch, an electric motor that is actuated by an electric power generated by the generator to drive the vehicle wheels, and an oil pump that supplies oil pumped up from an oil tank to the electric motor and the generator as a cooling oil, and supplies the oil to the part to be lubricated of the hydraulic clutch as a lubricating oil, the hybrid vehicle includes a valve that distributes the oil discharged from the oil pump to parts to be lubricated of the electric motor, the generator and the hydraulic clutch, wherein, when the hydraulic clutch is in an engaged state, the valve decreases the supply amount of the oil to the electric motor and the generator and increases the supply amount of the oil to the part to be lubricated of the hydraulic clutch, and when the hydraulic clutch is in a disengaged state, the valve increases the supply amount of the oil to the electric motor and the generator and decreases the supply amount of the oil to the part to be lubricated of the hydraulic clutch.

According to a second aspect of the present invention, in addition to the first aspect of the present invention, the valve is actuated by a hydraulic pressure that engages and disengages the hydraulic clutch.

Further, the second oil pump P2 of the embodiment corresponds to the oil pump of the first aspect of the present invention, and the flow passage switching valve V of the embodiment corresponds to the valve of the first aspect of the present invention.

According to the first aspect of the present invention, the hybrid vehicle includes an internal combustion engine that drives a generator and drives vehicle wheels via a hydraulic clutch, an electric motor that is actuated by an electric power generated by the generator to drive the vehicle wheels, and an oil pump that supplies oil pumped up from an oil tank to the electric motor and the generator as a cooling oil, and supplies the oil to a part to be lubricated of the hydraulic clutch as a lubricating oil.

The hybrid vehicle includes a valve that distributes the oil discharged from the oil pump to parts to be lubricated of the electric motor, the generator and the hydraulic clutch. When the hydraulic clutch is in an engaged state, the valve decreases the supply amount of the oil to the electric motor and the generator and increases the supply amount of the oil to the part to be lubricated of the hydraulic clutch, and when the hydraulic clutch is in a disengaged state, the valve increases the supply amount of the oil to the electric motor and the generator and decreases the supply amount of the oil to the part to be lubricated of the hydraulic clutch. Accordingly, the required amount of cooling oil and lubricating oil which varies depending on the operating mode of the hybrid vehicle can be estimated without requiring a special sensor and can be distributed in suitable proportions.

According to the second aspect of the present invention, because the valve is actuated by a hydraulic pressure that engages and disengages the hydraulic clutch, it is possible to actuate the valve without the need for special control means, and the structure of the control system is simplified.

Obviously, numerous modifications and variations of the present invention are possible in light of the above teachings. It is therefore to be understood that within the scope of the appended claims, the invention may be practiced otherwise than as specifically described herein.

What is claimed is:

1. A hybrid vehicle including an internal combustion engine that drives a generator and drives vehicle wheels via a hydraulic clutch, an electric motor that is actuated by an electric power generated by the generator to drive the vehicle wheels, and an oil pump that is actuated by the internal combustion engine, supplies oil pumped up from an oil tank to the electric motor and the generator as a cooling oil, and supplies the oil to a part to be lubricated of the hydraulic clutch as a lubricating oil, further comprising:
    a valve that distributes the oil discharged from the oil pump to the parts to be lubricated of the electric motor, the generator and the hydraulic clutch,
    wherein, when the hydraulic clutch is in an engaged state, the valve switches between passages by a hydraulic pressure that causes the hydraulic clutch to be in the engaged state and the valve decreases the supply amount of the oil to the electric motor and the generator and increases the supply amount of the oil to the part to be lubricated of the hydraulic clutch, and when the hydraulic clutch is in a disengaged state, the valve switches between passages by a hydraulic pressure that causes the hydraulic clutch to be in the disengaged state and the valve increases the supply amount of the oil to the electric motor and the generator and decreases the supply amount of the oil to the part to be lubricated of the hydraulic clutch.

2. A hybrid vehicle comprising:
    an internal combustion engine;
    a generator to be driven by the internal combustion engine to generate an electric power;
    a hydraulic clutch via which the internal combustion engine is to drive vehicle wheels;
    an electric motor to which the electric power generated by the generator is to be supplied to drive the vehicle wheels;
    an oil pump to be driven by the internal combustion engine to supply oil to the electric motor and the generator and to the hydraulic clutch; and
    a valve having a first position to decrease a first amount of the oil to be supplied to the electric motor and the generator and to increase a second amount of the oil to be supplied to the hydraulic clutch when the hydraulic clutch is in an engaged state, the valve having a second position to increase the first amount of the oil and to decrease the second amount of the oil when the hydraulic clutch is in a disengaged state.

3. The hybrid vehicle according to claim 2, wherein the valve is actuated by a hydraulic pressure to engage and disengage the hydraulic clutch.

4. The hybrid vehicle according to claim 2, wherein the oil pump is to supply the oil to the electric motor and the generator as a cooling oil and to the hydraulic clutch as a lubricating oil.

5. The hybrid vehicle according to claim 4, wherein the oil pump is to supply the oil to a frictional part of the hydraulic clutch as the lubricating oil.

6. The hybrid vehicle according to claim 1, further comprising:
    a lubrication passage to supply an oil to lubricated portions of the electric motor, the generator, and the hydraulic clutch,
    wherein the lubrication passage includes an oil passage to supply an oil to the electric motor and the generator, the oil passage not passing through a lubricated portion of the hydraulic clutch.

7. The hybrid vehicle according to claim 1, wherein the valve includes:
    a first output port configured to supply the oil to the electric motor and the generator; and
    a second output port configured to supply the oil to the hydraulic clutch.

8. The hybrid vehicle according to claim 1,
    wherein the valve includes:
        a first output port configured to supply a first quantity of oil as the supply amount of the oil to the electric motor and the generator; and
        a second output port configured to supply a second quantity of oil as the supply amount of the oil to the electric motor and the generator, and
    wherein the first quantity is smaller than the second quantity.

9. The hybrid vehicle according to claim 2, further comprising:
    a lubrication passage to supply an oil to lubricated portions of the electric motor, the generator, and the hydraulic clutch,
    wherein the lubrication passage includes an oil passage to supply an oil to the electric motor and the generator, the oil passage not passing through a lubricated portion of the hydraulic clutch.

10. The hybrid vehicle according to claim 2, wherein the valve includes:
- a first output port configured to supply the oil to the electric motor and the generator; and
- a second output port configured to supply the oil to the hydraulic clutch.

11. The hybrid vehicle according to claim 2,
wherein the valve includes:
- a first output port configured to supply a first quantity of oil as the supply amount of the oil to the electric motor and the generator; and
- a second output port configured to supply a second quantity of oil as the supply amount of the oil to the electric motor and the generator, and wherein the first quantity is smaller than the second quantity.

\* \* \* \* \*